(12) United States Patent
Emhardt

(10) Patent No.: US 6,641,728 B2
(45) Date of Patent: Nov. 4, 2003

(54) DEVICE FOR FILTERING A LIQUID, PARTICULARLY FOR FILTERING A POLYMER PLASTIC MELT

(75) Inventor: Peter Emhardt, Kassel (DE)

(73) Assignee: MAAG Pump Systems Textron GmbH, Kassel (DE)

( * ) Notice: Subject to any disclaimer, the term of this patent is extended or adjusted under 35 U.S.C. 154(b) by 0 days.

(21) Appl. No.: 10/115,197

(22) Filed: Apr. 2, 2002

(65) Prior Publication Data

US 2002/0158004 A1 Oct. 31, 2002

(30) Foreign Application Priority Data

Apr. 2, 2001 (DE) .......................... 101 16 408

(51) Int. Cl.[7] .......................... B29C 47/68; B01D 29/56; B01D 29/96
(52) U.S. Cl. ...................... 210/236; 210/488; 210/489; 425/197; 425/199
(58) Field of Search ................................. 210/232, 234, 210/236, 416.1, 435, 488, 489; 425/197, 199

(56) References Cited

U.S. PATENT DOCUMENTS

| | | | | |
|---|---|---|---|---|
| 2,636,218 | A | * 4/1953 | Orsini | 425/191 |
| 4,046,359 | A | * 9/1977 | Gellert | 366/87 |
| 4,059,525 | A | * 11/1977 | Krasnow | 210/236 |
| 4,701,118 | A | 10/1987 | Koching et al. | |
| 4,814,081 | A | * 3/1989 | Malinowski | 210/489 |
| 4,880,374 | A | * 11/1989 | Hamamura et al. | 425/185 |
| 5,922,194 | A | 7/1999 | Bruckmann et al. | |
| 6,392,007 | B1 | * 5/2002 | Buchanan et al. | 528/310 |

FOREIGN PATENT DOCUMENTS

| | | |
|---|---|---|
| DE | 35 27 173 C1 | 9/1985 |
| DE | 295 17 140 U | 2/1996 |
| DE | 195 19 907 C2 | 3/1997 |
| EP | 0 922 558 A1 | 6/1999 |

\* cited by examiner

Primary Examiner—Fred G. Prince
(74) Attorney, Agent, or Firm—Greenberg Traurig, P.C.

(57) ABSTRACT

A device for filtering a liquid, in particular for filtering a polymer plastic melt, has a housing which includes an inlet channel, a connecting channel situated in a shaft and a discharge channel, as seen in the flow direction of the liquid to be filtered, where the connecting channel has at least two filters arranged side by side and aligned across the flow direction of the liquid in the connecting channel, and the shaft is mounted in a bore in the housing so that it is axially displaceable and is liquid-tight, so that by axial displacement of the shaft, the two filters can be moved between a filtration position in which the inlet channel is connected to the discharge channel through the connecting channel, and an externally accessible cleaning position in which the connection from the inlet channel to the discharge channel is interrupted, and vice versa. As seen in the flow direction (10) of the liquid to be filtered, the connecting channel (4) has a first area (4a), which is arranged directly upstream from the filters (9a, 9b) and forms a single common liquid distribution space (4a) for the two filters (9a, 9b). Immediately following the first area (4a), there is a second area (4b) where the two filters (9a, 9b) are arranged side by side, so that the two filters (9a, 9b) partially overlap, whereby the first area (4a) and the second area (4b) of the connecting channel (4) having a cross section, as seen normal to the flow direction of the liquid to be filtered, which corresponds in shape to the shape of two overlapping circles.

14 Claims, 4 Drawing Sheets

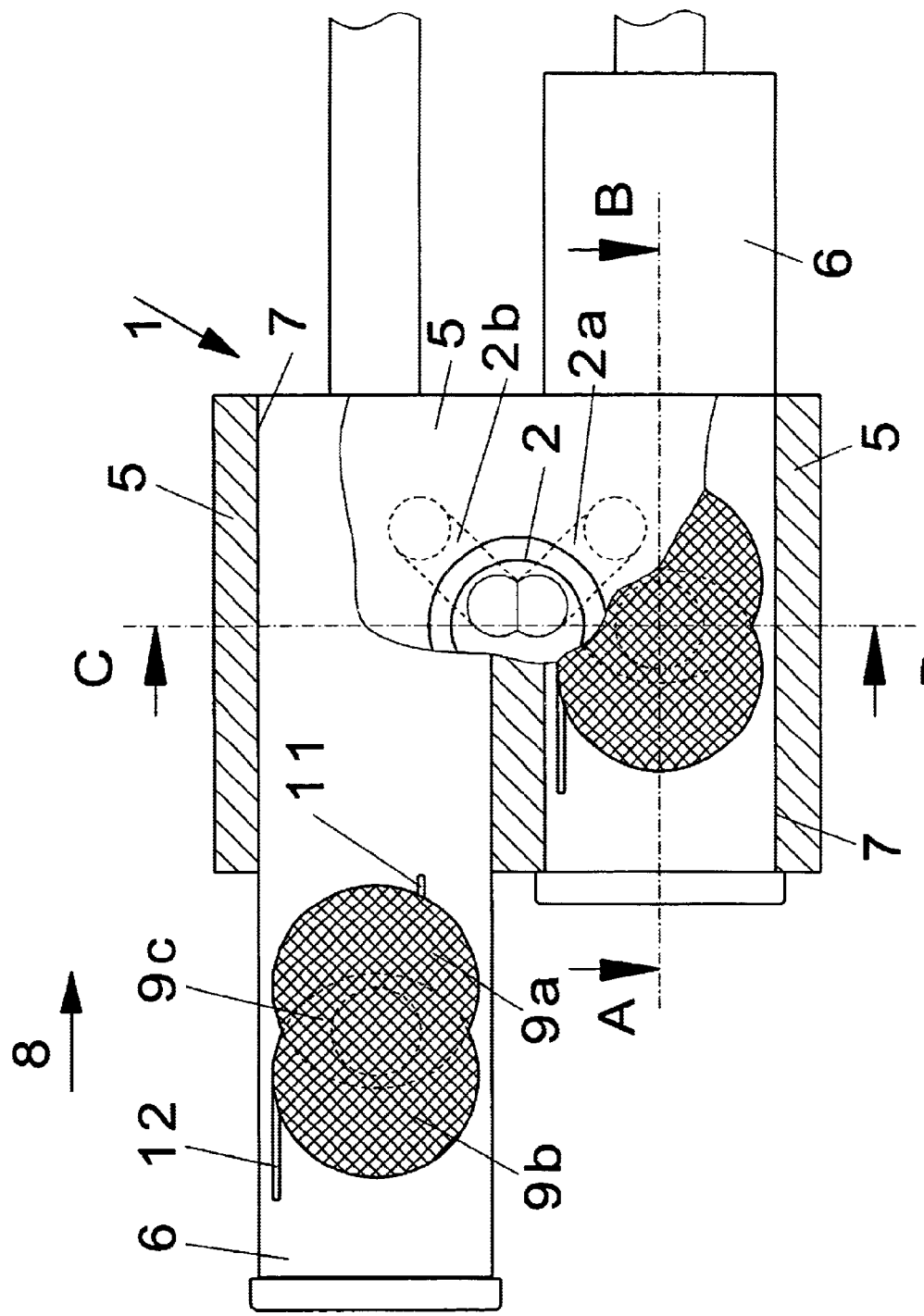
FIG.: 1

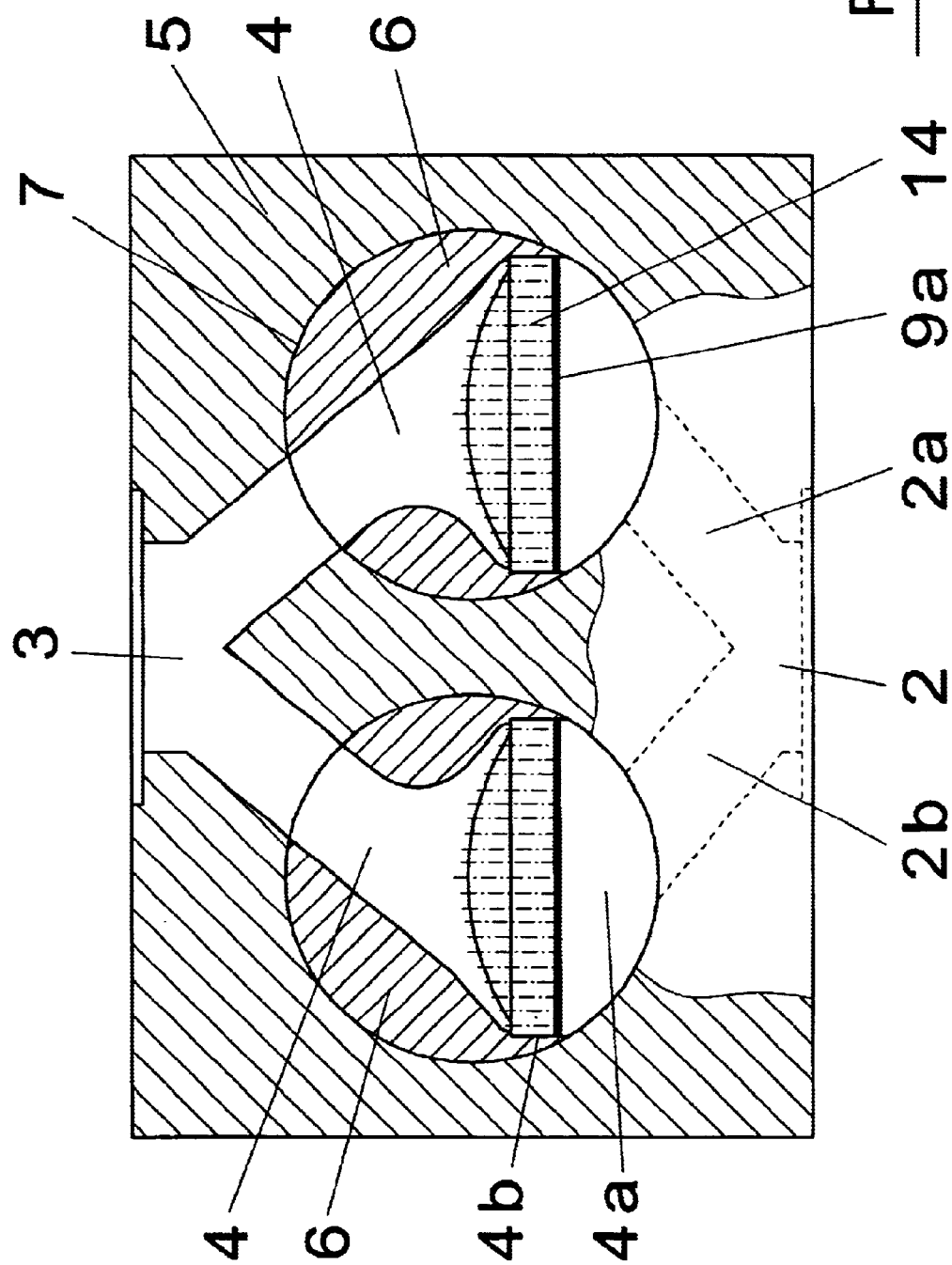
FIG.: 2

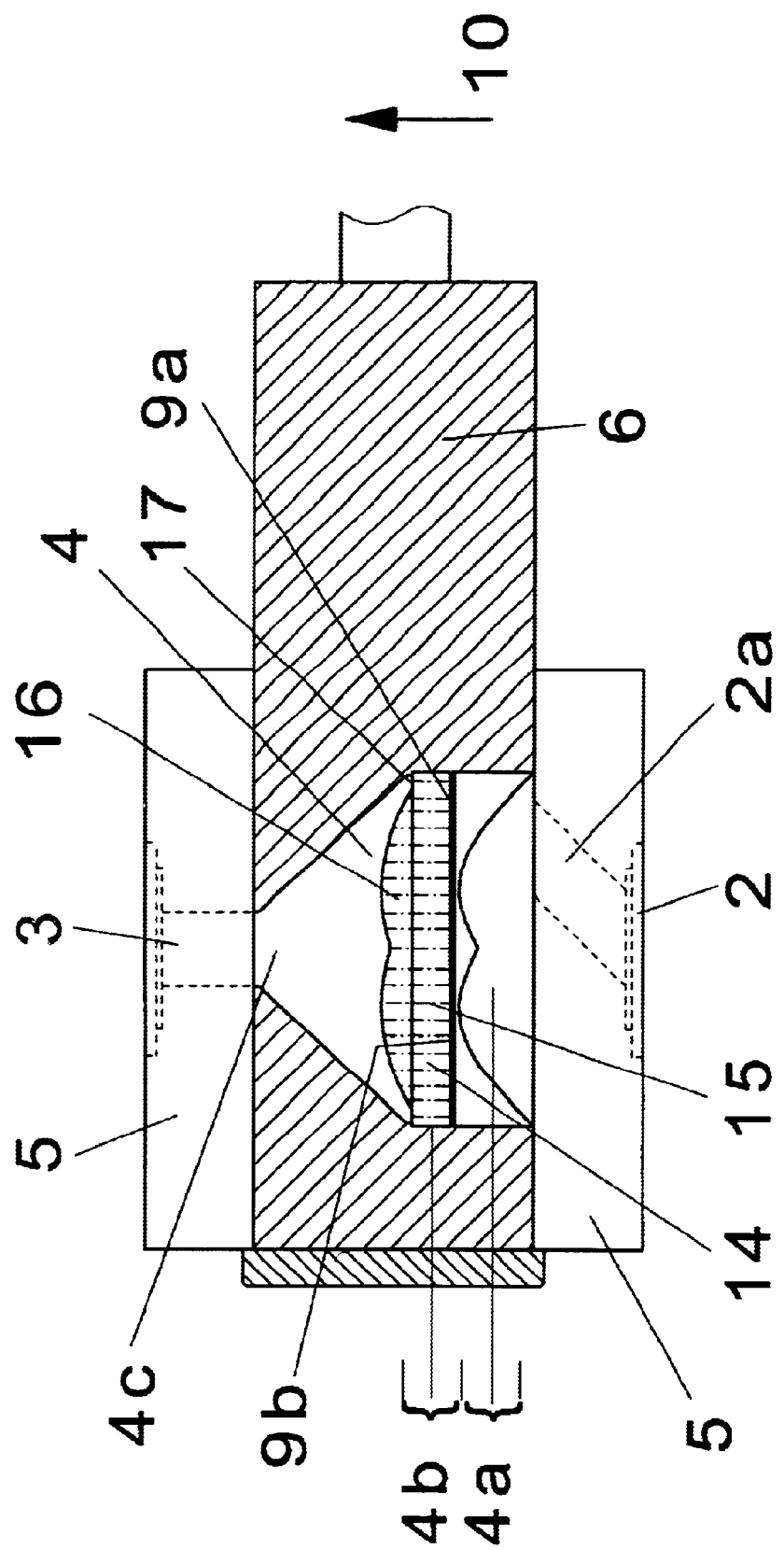
FIG.: 3

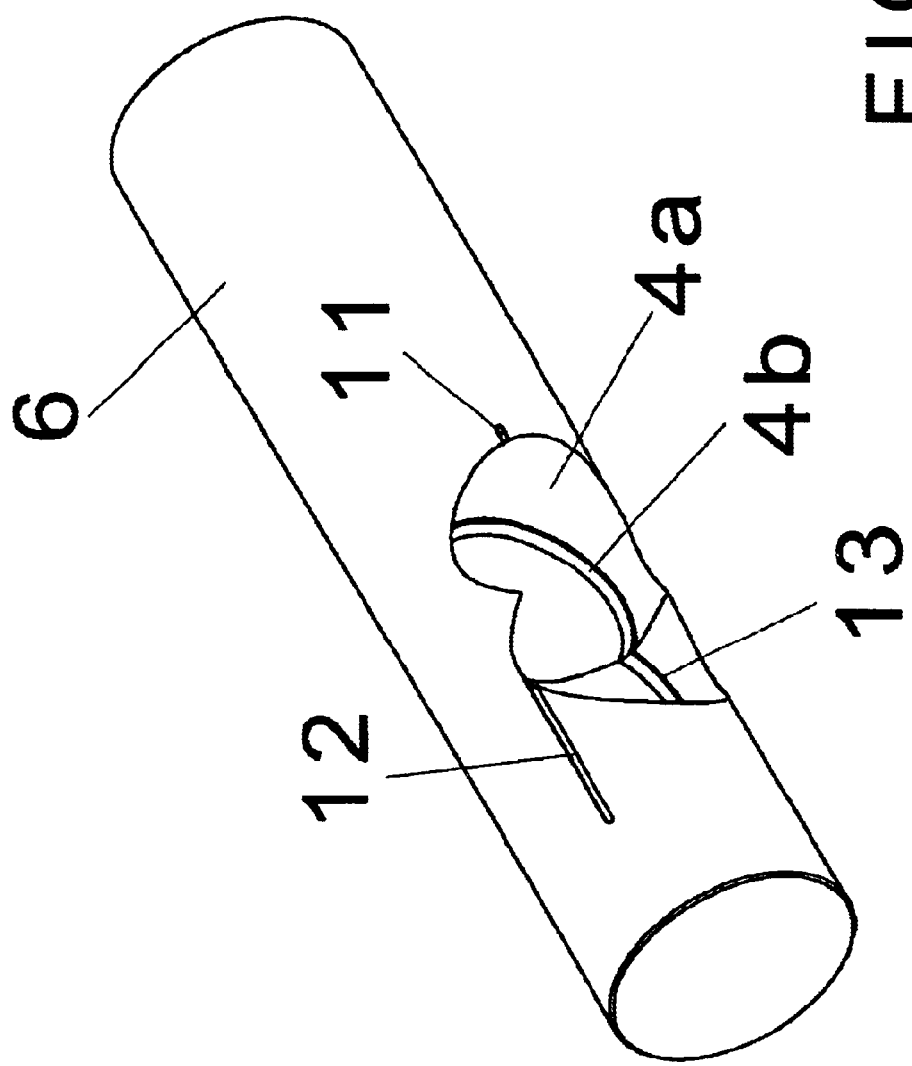

DEVICE FOR FILTERING A LIQUID, PARTICULARLY FOR FILTERING A POLYMER PLASTIC MELT

BACKGROUND OF THE INVENTION

1. The Technical Field of the Invention

The present invention relates to a device for filtering a liquid, particularly for filtering a polymer plastic melt, having an inlet channel, a connecting channel, and a discharge channel.

2. Background Art

A device for filtering a polymer plastic melt is known from German Patent 195 19 907 C. The known device, which is referred to as a filter changing device in German Patent 195 19 907 C, has a housing which includes an inlet channel, a connecting channel arranged in a shaft and a discharge channel in that order, as seen in the flow direction of the liquid to be filtered. With the known filter changing device, the connecting channel is equipped with at least two filters arranged side by side and across the flow direction of the liquid in the connecting channel, the cylindrical shaft being mounted axially displaceable in a cylindrical bore in a liquid-tight manner accordingly. Through an axial displacement of the shaft, the two filters are moved between a filtration position, in which the inlet channel is connected to the discharge channel through the connecting channel, and an externally accessible cleaning position, in which the connection from the inlet channel to the discharge channel is interrupted and vice versa, so that both filters can optionally filter the liquid flow passing through them simultaneously either in the filtration position, which is also referred to as the working position in German Patent 195 19 907 C, or in the cleaning position. Through an axial displacement of the shaft, the filters with the known device can be brought into a position, which is referred to as the third filter changing position in German Patent 195 19 907 C, whereby in this position, the filter carrier assumes a position in which the filters are accessible from the outside, so that the filters can be replaced when they become soiled accordingly.

Due to the fact that with the known device, the two filters are situated with an axial distance between them as seen in the axial direction of displacement of the shaft, the known device requires a shaft designed to be relatively long axially in order to make available the required sealing face between the wall of the bore and the outside wall of the shaft.

To overcome this disadvantage of the relatively large axial length of the shaft and of the housing which cooperates with it, German Utility Model 295 19 140 U proposes that the filter be widened in the shape of an oval as seen in the direction of axial displacement of the shaft, so that with this known filter device accordingly, the two filters described above, which are situated side by side and with a distance between them are replaced by one single oval filter. However, German Utility Model 295 17 140 U explicitly points out that to avoid an irregular liquid flow, as seen over the surface of the filter, the known oval filter is provided with a special filter carrier plate which is situated downstream from the oval filter and supports the filter during the filtration process, whereby this filter carrier plate has longer channels in the central portion of the filter and shorter channels in the corner areas to equalize the flow.

SUMMARY OF THE INVENTION

It is an object of the present invention to provide a device for filtering a liquid, particularly a polymer plastic melt, which can be manufactured and operated especially inexpensively while retaining a compact design.

The device according to this invention for filtering a liquid, particularly for filtering a polymer plastic melt, has, also like the known devices described above, a housing which includes an inlet channel, a connecting channel arranged exclusively in a shaft and a discharge channel in that order, as seen in the flow direction of the liquid to be filtered. The connecting channel, which is delimited by the thickness of the shaft, has at least two filters arranged side by side and oriented across the flow direction of the liquid in the connecting channel, whereby the shaft, which is designed to be primarily cylindrical, is mounted so that it is liquid-tight and is axially displaceable in a bore of the housing fitted to it. Due to the axial displacement of the shaft with the device according to this invention, the two filters can be moved between a filtration position, in which the inlet channel is connected to the discharge channel through the connecting channel and the liquid flow is passed continuously through the connecting channel and thus also through the two filters, and a cleaning position, which is accessible from the outside and in which the connection of the inlet channel to the discharge channel is interrupted and the two filters can be removed from the connecting channel and cleaned or replaced accordingly. In contrast with the prior art, the connecting channel of the device according to this invention has a first area, which is situated directly upstream from the two filters arranged side by side, and which forms a single common liquid distribution space for the two filters, and a second area connected directly to the first area, as seen in the flow direction of the liquid to be filtered, whereby in the second area the two filters are situated side by side so that the two filters partially overlap. Both the first area and the second area of the connecting channel have a cross section perpendicular to the flow direction of the liquid to be filtered and thus as seen from above such that its shape corresponds to the shape of two overlapping circles.

In other words, the device according to this invention differs from the prior art essentially in that two circular filters are situated side by side and are arranged so that they overlap in a suitably shaped second area of the connecting channel, whereby a first area of the connecting channel also having overlapping circular cross sections upstream from these two filters, so that a single common liquid distribution space is formed for both filters in this way.

The device according to this invention has a number of advantages. Thus, it should be pointed out first that in contrast with the device known from German Patent 195 19 907 C, it has a much shorter overall length even with filters of an identical size, because in this way the space upstream from the filters is not designed as separately arranged individual bores running in parallel. Due to the compact arrangement of the two filters in an overlapping manner and side by side, it is possible with the inventive device to greatly reduce the required sealing area between the wall of the shaft and the inside surface of the bore supporting it, by accepting a slight reduction in the filter area, which depends on the degree of overlapping of the two filters; this results in a corresponding cost advantage in the production of the inventive device, because high demands are made regarding the precision of the shafts and the inside wall of the bore.

In comparison with the device known from German Utility Model 295 17 140 U, the inventive device can be produced much less expensively because, as explained above, the first and second areas of the connecting channel consist of two overlapping bores, whereas in the known device it is because of the oval design of the filter necessary, to produce these two areas, which are situated upstream from the oval filter, also as an oval connecting channel area, which necessitates additional machining steps. In addition, these oval filters to be used in the known device are specially manufactured parts which are many times more expensive in comparison with the filters used with the inventive device, so that considerable additional costs are incurred with any replacement of the filters, which may be necessary in a cycle of hours or days. A reason for a limited technical application of the known device may also be seen in the special design as an oval filter, because the plurality of filter finenesses offered with traditional round filters are not available for this design. In addition, because of the oval design of the filter, the known device also requires the production of supporting projections which are also specially designed with an oval shape, projecting into the connecting channel downstream from the filters, which requires additional production-related costs with the device known from German Utility Model 295 17 140 U.

In addition, another advantage of the device according to this invention is that in comparison with a filter changing device which has only a single filter with an identical diameter of the shaft, the filter surface area is greatly increased, e.g., in particular by a factor of 1.5 to 2, with the inventive device, depending on the degree of overlapping of the two filters, so that this results in longer operating times accordingly before replacement of the filters is necessary, which is associated with an interruption in production.

By way of clarification, it should be emphasized that the inventive device does not permit any backwashing of the filters, in comparison with the device known from German Patent 195 19 907 C, but instead permits only a continuous filtration of the liquid up to a point in time when the filter surfaces are soiled accordingly and thus replacement is necessary.

In addition, it should be pointed out that the term "overlapping" as used in the present description is to be interpreted as meaning that this term covers both contact between filters arranged side by side and overlapping of the filters themselves, whereby the filters are not necessarily arranged in a double layer in the overlap area. Instead, it depends on the respective viscosity, the method of introducing the liquid to be filtered into the liquid distribution space and the type and manner of the flow conditions in the liquid distribution space, because in the overlap area of the two circular filters, the filter is arranged there in one layer, two layers or multiple layers, whereby the device according to this invention makes it especially simple and effective to adapt it to the respective liquid to be filtered with regard to its size and also with respect to the number of layers of the filter provided there, so that it is ensured that the oncoming (entering) flow arrives uniformly at the total filter area, which is composed of the overlapping circular individual filters, and passes through it completely and uniformly.

In addition, the term "across the flow direction of the liquid" as used in conjunction with the arrangement of the filters in the connecting channel means that these filters are aligned so that they project perpendicular to the flow direction of the liquid in the connecting channel, so that the liquid does in fact also flow through the filters. Furthermore, it should be pointed out by way of clarification that with the inventive device, the connecting channel is the channel which is exclusively in the shaft and which extends across the entire width of the shaft, whereby upstream from the filters, this connecting channel ends at the inlet channel, and downstream from the filters, this connecting channel ends at the discharge channel. The terms "upstream" and "downstream" are used in the present description to refer to the flow direction of the liquid during filtration.

An especially suitable embodiment of the inventive device provides for the first and second areas of the connecting channel to be formed by two overlapping bores having identical diameters, extending perpendicular to the axial direction of the shaft, preferably of the cylindrical shaft, over approximately 30% to 60% of the total thickness of the shaft. In other words, in this embodiment of the inventive device, the first and second areas of the connecting channel extend approximately to the radial center of the shaft, so that accordingly, the filters are also situated there and thus they have a maximum size for the respective cylindrical shaft with respect to their filter surface area.

In particular when processing plastic melts which harden with even a minor drop in temperature and then form difficult-to-remove deposits on the walls of the channel, it is advisable here to select first and second areas of the connecting channel with dimensions such that they extend over only 30% to approximately 40% of the total thickness of the shaft, whereas, as already mentioned above, from the standpoint of maximizing filter surface area, preferably as a function of the thickness of the filters, and the use of supporting plates on which the filters are supported during filtration, the position of the filters and thus the length of the first and second areas of the connecting channel are selected so that preferably the filters themselves are positioned at the radial center of the shaft.

It has surprisingly been found that with many liquids for filtration, which also differ in their rheological behavior in particular, excellent flow conditions are achieved, in particular with regard to the uniformity of oncoming flow over the total filter surface area if the cross-sectional areas of the first and second areas of the connecting channel in which the two circular cross sections overlap constitute 3% to 50%, and preferably 20% to 40%, of the total cross-sectional area. In other words, with this embodiment of the inventive device in comparison with a known device which has only a single circular connecting channel area upstream from the filter, the cross-sectional area of the first and second areas of the connecting channel is increased by a factor of 1.97 to 1.5, preferably by a factor of 1.8 to 1.6, with the inventive device, so that a sufficiently large quantity of liquid is sent continuously to the two filters accordingly, resulting in a significant increase in production on the one hand and a savings in terms of personnel on the other hand due to the use of the inventive device, because the replacement intervals are lengthened.

To simplify replacement of the two filters on the inside radially as seen across the thickness of the shaft, another embodiment of the inventive device has a connecting channel in which the first and second areas, which are designed as overlapping circles when seen in cross section, have a dimension slightly larger than the diameter of each circular filter. In particular, it has been found that even when there are deposits of liquid residues on the walls of the first and second areas of the connecting channel, it is possible to replace the filters with no problem if the circles of the first area and the second area, which overlap when seen in cross section, have a diameter which is especially 5% to 15% larger than the diameter of the circular (round) filter.

An especially effective means of enlarging the total filter area while retaining a given shaft thickness is achieved with an embodiment of the inventive device in which the two areas are arranged in the shaft, especially in a cylindrical shaft, so that in the direction of axial displacement relative to the housing bore, their cross sections are approximately in the shape of a horizontal figure eight. In other words, the two areas have their largest dimension in the axial direction of the shaft in this embodiment of the inventive device, while the dimension perpendicular to this axial direction corresponds to the diameter of the filter or a quantity 5% to 15% larger, as described above with a preferred embodiment, to thereby facilitate removal of the filter from this connecting channel area.

With the inventive device, to prevent unfiltered liquid from passing by the filters in the overlap area, another preferred embodiment of the inventive device provides for the filters to overlap between 2% and 10%, based on the total filter area with several layers in the overlap area, whereby two layers of the filter are preferably arranged one above the other tightly there. In other words, with this embodiment of the device according to this invention, between 98% and 90% of the total filter area is formed by the two round (circular) single-layer filters, while the remaining 2% to 10% of the total filter area has a multilayer arrangement of the filters. As a result, this overlap area of the liquid to be filtered which is flowing through this overlap area offers a greater flow resistance, thus resulting in an especially uniform distribution of liquid over the remaining single-layer total filter area.

In an advantageous refinement of the embodiments of the device according to this invention as described above, an especially efficient embodiment of the inventive device provides for the device to have two shafts aligned in parallel, each having two filters, and the inlet channel is divided into two partial inlet channels, whereby these two partial inlet channels are also positioned exclusively in the housing. In this way, it is possible to double the filter capacity in comparison with the embodiments of the inventive device described above, which have only one shaft, each having two filters. In addition, this embodiment of the inventive device allows filtration of the liquid not to have to be interrupted even when a shaft is in its externally accessible cleaning position, i.e., in a position in which the two filters of this shaft can be replaced and thus they are not available for actual filtration. As a result, with this preferred embodiment of the inventive device, there is no interruption in production when the two filters are replaced.

To achieve a satisfactory and uniform distribution of the liquid to be filtered over the total filter area with this especially preferred embodiment of the inventive device as described above, which may also have two shafts or other additional shafts accordingly, each partial inlet channel in a refinement of this invention is oriented in the housing so that its outlet opening opens at the edge of the liquid distribution space, preferably at the axially outer edge. In other words, in this embodiment of the inventive device, introduction of the liquid to be filtered into the liquid distribution space at the edges is deliberately selected, and it has surprisingly been found in this regard that despite this supply at the edge, uniform flow over the total filter area is achieved.

To remove air that has collected in the liquid distribution space in particular in axial displacement of the shaft from the cleaning position to the filtration position with the inventive device, an advantageous embodiment of the device according to this invention provides for a vent opening to be provided for the liquid distribution space, preferably being designed as a groove running axially over a portion of the shaft and allocated to the edge of the liquid distribution space. Thus, this groove running axially together with the wall of the housing bore, which supports the shaft so that it is axially displaceable, forms a channel opening preferably outside the housing and aligned on the shaft so that it is sealed with an axial displacement of the shaft when the shaft is in its filtration position.

Especially when the inventive device has another further groove, also running axially, in addition to the groove described above, and when these two grooves are situated at axially opposite ends relative to the edge of the liquid distribution space, it is possible with this embodiment of the inventive device to remove air that has collected in the liquid distribution space in an especially gentle manner if the shaft is displaced again axially at a predetermined rate out of the cleaning position and into its filtration position. The additional groove running axially allows a relatively small amount of liquid which is to be filtered to be added at first to the liquid distribution space through the additional groove, so that accordingly the air is removed from it successively through the other groove running axially. With another continuous displacement of the shaft, the quantity of liquid to be filtered, which is supplied to the liquid distribution space, is then increased successively, so is that the air is also accordingly displaced further from the liquid distribution space until it is filled only with the liquid to be filtered.

In particular, it also presents itself with the inventive device that in the flow direction of the liquid to be filtered, the connecting channel has a third area which is provided downstream from the two filters arranged side by side, whereby in this third area, the connecting channel has a common connecting channel end section which has a round (circular) cross section. This ensures in particular that with this embodiment of the inventive device, the connecting channel end section is aligned satisfactorily with the discharge channel without forming hydrodynamically problematical corners and/or edges, so that the mold or nozzle situated downstream from the device is supplied with the hydrodynamically stabilized flow of a filtered liquid.

To securely support the two filters arranged side by side as needed for filtration with the device according to this invention, another preferred embodiment of the inventive device provides for a supporting plate which is arranged downstream from the filters and is provided with flowing-through channels to be assigned to these two filters arranged side by side. This supporting plate has first, as seen in the flow direction of the liquid to be filtered, a planar supporting surface to support and hold the filters, whereby the two filters are supported on this supporting surface during the filtration process. Downstream from this supporting surface, the supporting surface is provided in one piece with a spherically bulging area, whereby both the supporting surface and the bulging area are equipped with suitably dimensioned flowing-through channels. To support this supporting plate permanently and without any unwanted offset within the second area of the connecting channel, this supporting plate has a planar edge surface designed on the downstream surfaces of the supporting surface at a uniform distance from the edge of the supporting plate, said planar edge surface being supported on a wall surface that projects into the connecting channel, whereby at least the supporting surface has a shape corresponding to the shape of the second area of the connecting channel as seen in a view from above.

From a hydrodynamic standpoint, in particular from the standpoint of creating a uniform oncoming (entering) flow and flow through the total filter area, it is especially advantageous if the bulging area situated downstream from the supporting surface is composed of two overlapping and symmetrical spherical calotte shells is (cups) which come in contact in the central middle section of the connecting channel or overlap to form a common plane of intersection. Such a supporting plate can be produced especially inexpensively and very easily with a high precision due to the fact that two traditional supporting plates are cut off, forming a common sectional surface, and then are joined together along the sectional surface.

Advantageous refinements of the inventive device are characterized in the sub-Claims.

BRIEF DESCRIPTION OF THE DRAWINGS

The device according to this invention is described in greater detail below on the basis of one embodiment in conjunction with the drawing, which shows:

FIG. 1 is a schematic vertical section through the device, partially with a perspective schematic indication of the view;

FIG. 2 is a schematic vertical section along line C-D in FIG. 1;

FIG. 3 is a schematic horizontal section along line A-B in FIG. 1, and

FIG. 4 is a perspective view of a shaft.

DETAILED DESCRIPTION OF THE DRAWINGS

FIGS. 1–3 show different sectional views and FIG. 4 shows a perspective view of an embodiment of the filtration device, where the same parts are provided with the identical reference numbers in all the figures.

A device labeled as 1 on the whole for filtration of a liquid, in particular for filtering a plastic melt, has a housing 5, with an inlet channel 2 and a discharge channel 3 being situated inside the housing 5. The inlet channel 2 is connected to the discharge channel 3 via a connecting channel 4, where the connecting channel 4 extends over the entire thickness of a shaft 6, which is supported in a housing bore 7 in a liquid-tight and axially displaceable manner (direction of arrow 8 and in the opposite direction), as shown best in FIGS. 1 and 2.

In the embodiment selected here, the device 1 has two shafts 6 having identical designs and arranged in parallel with one another, hereinafter being referred to as upper shaft 6 and lower shaft 6 with reference to FIG. 1.

Each shaft 6 of the device 1 has a connecting channel 4 which extends over the total thickness of the cylindrical shaft 6, whereby the connecting channel 4 has a first area 4a, a second area 4b and a third area 4c, as seen in the flow direction (arrow 10, FIG. 3) of the liquid to be filtered. Within the second area 4b of the connecting channel 4, there are two directly overlapping filters 9a and 9b, as shown especially in the schematic views in FIGS. 1 and 3. Upstream from these filters 9a and 9b, which are arranged side by side and overlap in area 9c, the connecting channel 4 has the first area 4a, which forms a liquid distribution space for both filters 9a and 9b at the same time.

The first area 4a and the second area 4b of the connecting channel 4 have a cross section which corresponds to the cross-sectional shape of overlapping circular cross sections, this cross-sectional shape also being referred to as a horizontal figure eight above.

As shown in particular from FIGS. 1 and 2, the inlet channel 2 is divided into two partial inlet channels 2a and 2b within the housing 5, to thereby uniformly supply the liquid distribution space 4a with the liquid to be filtered. The outlet openings of these partial inlet channels 2a and 2b open at the edge (right edge, FIG. 1) into the liquid distribution space 4a, whereby in the area of this confluence of the partial inlet channels 2a and 2b, the shaft has a groove 11 running axially in its lateral surface, as indicated best in FIGS. 1 and 3. Opposite this axial groove 11, another groove 12 which also runs axially is provided in the lateral surface of the shaft, whereby the two grooves 11 and 12 are connected at the end to the liquid distribution space 4a.

As shown especially in FIG. 4, which illustrates in a perspective view the shaft without the corresponding filters, the area 4b has projections 13 running on the edge and protruding radially into the connecting channel 4, serving to support a supporting plate 14 (FIG. 2) for the filters 9a and 9b, the respective supporting plate 14 being supported against the projections 13 during filtration.

Each supporting plate 14 (FIG. 3) which serves to support two filters 9a and 9b has a planar supporting surface 15 and an area 16 which is connected to it and is shaped with a spherical cup-shaped bulge (calottes shells), whereby both the supporting plate 15 and the spherical cup-shaped area 16 connected to it in one piece are provided with flowing-through channels which form a continuous passage for the filtered liquid downstream from the filters 9a and 9b. With the supporting plate 14 shown in FIG. 3, the bulging area 16 is formed by the fact that two spherical cup-shaped areas are joined together symmetrically, forming a common sectional surface. In addition, supporting plate 14 has a planar edge surface 17 which is provided downstream from the supporting surface, where this planar edge surface 17 is in contact with the projections 13.

The device described above is used as follows. Upstream from the inlet channel 2 there is usually an extruder (not shown) which conveys the liquid to be filtered, in particular the plastic melt, continuously through the device 1 in the direction of arrow 10. The two shafts 6 are in a position like that illustrated in FIG. 1 for the lower shaft 6, i.e., the liquid to be filtered is conveyed through the inlet channel 2, the partial inlet channels 2a and 2b following that, to the liquid distribution spaces 4a of both shafts located upstream from the filters 9a and 9b. Then the liquid to be filtered flows through the two filters 9a and 9b situated side by side and goes into the connecting channel end section 4c, which is aligned with the discharge channel 3.

If it is then found during filtration that a pair of filters is loaded with particles that have been filtered out, the shaft in this regard enters by means of its axial displacement a position like that illustrated in FIG. 1 for the upper shaft 6. In this position, which is also referred to above as the cleaning position, the filters 9a and 9b may be removed from the corresponding area 4b of the connecting channel 4 and replaced by new filters, so that through an axial displacement in the direction of arrow 8, this shaft is then moved back in the direction of the filtration position. Then first the confluence of the partial inlet channel 2b comes in contact with the groove 11, which leads to a partial stream of the liquid to be filtered being deflected into the liquid distribution space, while at the same time the air that has collected in the liquid distribution space is displaced by the liquid penetrating in the space through the other groove 12, whose end is still partially outside the housing 5. With any further axial displacement of the shaft 6 in the direction of arrow 8, as soon as the liquid distribution space 4a is completely vented, liquid then reaches the outside, so that at this time, the shaft is then brought into its filtration position, as illustrated in FIG. 1 for the lower shaft.

For the sake of thoroughness, it should be pointed out that the sectional view according to FIG. 2 illustrates the device 1 shown in FIG. 1 in a position in which both shafts 6 assume a position like that illustrated for the lower shaft 6.

What is claimed is:

1. A device for filtering a liquid, in particular for filtering a polymer plastic melt, having a housing which includes an inlet channel, a connecting channel situated in a shaft and a discharge channel, as seen in a flow direction of the liquid to be filtered, whereby the connecting channel has at least two filters arranged side by side and situated across the flow direction of the liquid in the connecting channel, and the shaft is mounted in a bore in the housing so that it is axially displaceable and is liquid-tight, so that by axial displacement of the shaft, the two filters can be moved between a filtration position in which the inlet channel is connected to the discharge channel through the connecting channel, and an externally accessible cleaning position in which the connection from the inlet channel to the discharge channel is interrupted, and vice versa, characterized in that the connecting channel (4) has, as seen in the flow direction (10) of the liquid to be filtered, a first area (4a), which is situated directly upstream from the filters (9a, 9b) and forms a single common liquid distribution space (4a) for the two filters (9a, 9b), and that the first area (4a) is followed directly by a second area (4b) where the two filters (9a, 9b) are situated side by side, so that the two filters (9a, 9b) partially overlap, whereby the first area (4a) and the second area (4b) of the connecting channel (4) having a cross section, as seen normal to the flow direction of the liquid to be filtered, which corresponds in shape to the shape of two overlapping circles.

2. The device according to claim 1, characterized in that the first and second areas (4a, 4b) of the connecting channel (4) are formed by two overlapping bores having identical diameters, extending perpendicular to the axial direction of the shaft (6) over approximately 30% to approximately 60% of the total thickness of the shaft (6).

3. The device according to claim 1, characterized in that the cross-sectional area in which the two circular cross sections of the two areas (4a, 4b) overlap amounts to 3% to 50% of the total cross-sectional area.

4. The device according to claim 3, characterized in that the cross-sectional area in which the two circular cross sections of the two areas (4a, 4b) overlap amounts to 20% to 40% of the total cross-sectional area.

5. The device according to claim 1, characterized in that the overlapping cross-sectional circles of the two areas (4a, 4b) have a diameter which is 5% to 15% larger than the diameter of the circular filter (9a, 9b).

6. The device according to claim 1, characterized in that the two areas (4a, 4b) are situated in the shaft (6) in such a way that their cross sections have approximately the shape of a horizontal figure eight, as seen in the direction of axial displacement (8) of the shaft (6).

7. The device according to claim 1, characterized in that the filters (9a, 9b) overlap between 2% and 10%, based on the total filter area, in several layers.

8. The device according to claim 1, characterized in that the device (1) has two shafts (6) aligned in parallel with one another, each having two filters (9a, 9b), and the inlet channel (2) is divided into two partial inlet channels (2a, 2b), both also being positioned in the housing (5).

9. The device according to claim 8, characterized in that each partial inlet channel (2a, 2b) is aligned so that its outlet opening opens at the edge of the liquid distribution space (4a), preferably at the axially outer edge.

10. The device according to claim 1, characterized in that a groove (12) running axially over a portion of the shaft (6) is provided for the edge of the liquid distribution space (4a).

11. The device according to claim 1, characterized in that another groove (11) running axially is provided for the area of the liquid distribution space (4a) which is arranged axially opposite relative to the edge of the liquid distribution space (4a).

12. The device according to claim 1, characterized in that, as seen in the flow direction (10) of the liquid to be filtered, the connecting channel (4) has a third area (4c) which is provided downstream from the two filters (9a, 9b) arranged side by side, whereby in this third area (4c) the connecting channel (4) has a common connecting channel end section having a circular cross section.

13. The device according to claim 1, characterized in that the two filters (9a, 9b) have a supporting plate (14) arranged downstream from the filters (9a, 9b) and provided with flowing-through channels, said supporting plate having a planar supporting surface (15), as seen in the flow direction (10) of the liquid to be filtered, for supporting and holding the filters (9a, 9b) during the filtration and a spherical area (16) which bulges outward in the flow direction and is connected thereto, whereby the bulging area is provided with additional flowing-through channels, the flowing-through channels are aligned with the other flowing-through channels, and the planar supporting surface (15) has a planar edge surface (17) on its downstream surface.

14. The device according to claim 13, characterized in that the area (16) which bulges outward is formed by two overlapping symmetrical calotte shells.

* * * * *